Jan. 31, 1950     J. REMONTE     2,496,022
ELECTRIC LAWN MOWER

Filed June 3, 1946     2 Sheets-Sheet 1

Inventor
John Remonte
By Kimmel & Crowell
Attorneys

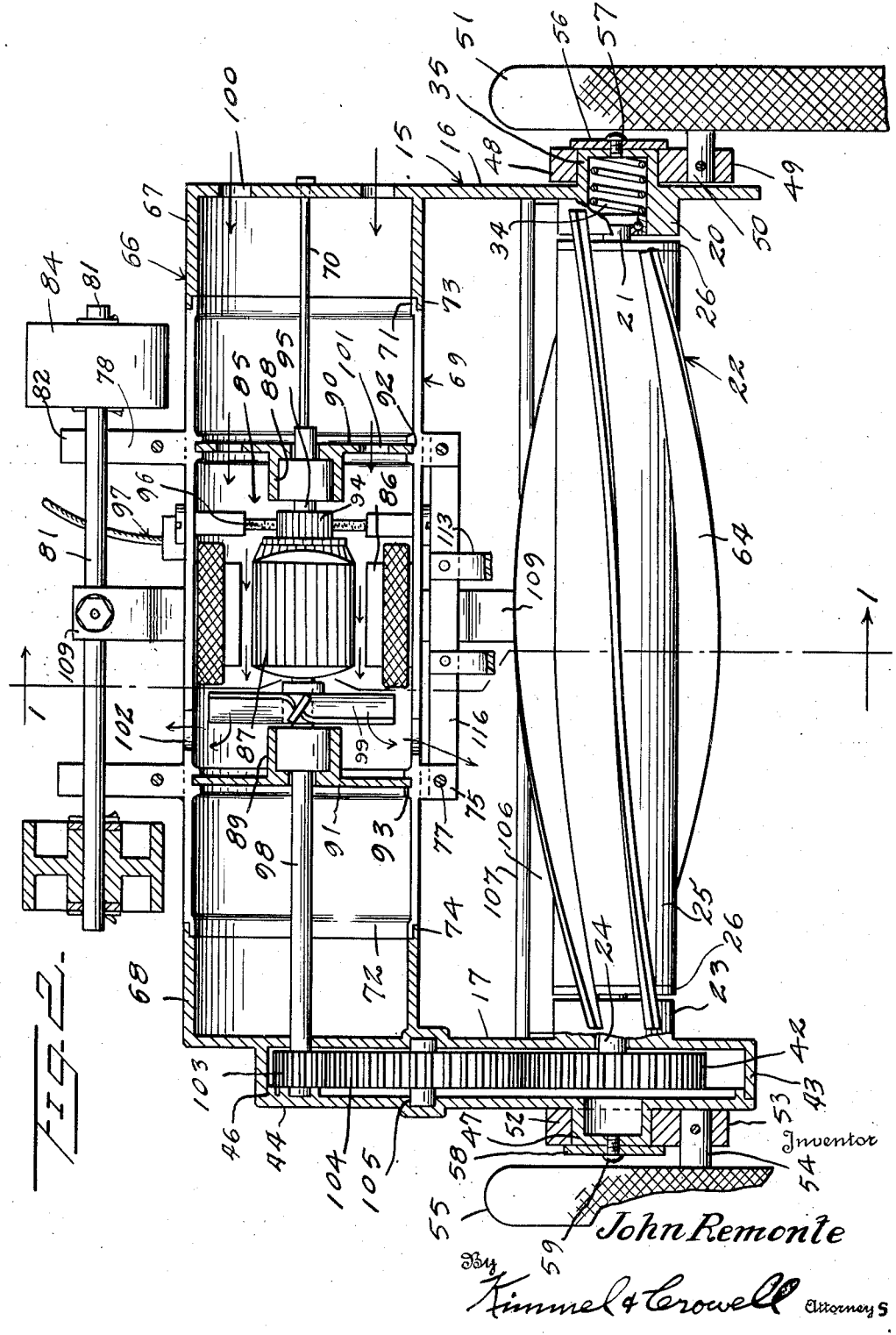

Patented Jan. 31, 1950

2,496,022

UNITED STATES PATENT OFFICE 2,496,022

ELECTRIC LAWN MOWER

John Remonte, Corsicana, Tex.

Application June 3, 1946, Serial No. 673,987

2 Claims. (Cl. 172—36)

This invention relates to electric lawnmowers.

An object of this invention is to provide an electric lawnmower which incorporates therewith a high speed motor coupled to the rotary reel or blade by means of a speed reducing means.

Another object of this invention is to provide in an electric lawnmower an improved means for keeping the high speed motor cool.

Another object of this invention is to provide in a lawnmower of this kind an improved motor housing which forms a part of the mower frame.

A further object of this invention is to provide in a mower of this kind an improved rotary blade or reel structure which includes means for preventing grass from being wound about the bearings at each end of the structure.

A further object of this invention is to provide an improved stationary cutting blade which is adjustable relative to the rotary blades and is spring-tensioned and pivotally mounted so that large objects or articles may pass between the blades without causing damage thereto.

A further object of this invention is to provide in a lawnmower an improved floating stationary blade which is adjustable relative to the rotary blade structure, the stationary blade including a rearwardly extending combined adjusting bar and shoe which may engage projections in the ground for widening the space between the rotary and stationary blades.

A further object of this invention is to provide a mower of this kind including an improved means for adjusting the cutting blades relative to the ground.

A further object of this invention is to provide in a mower of this kind an improved means for grounding the electric current so that the operator will not be shocked in the event of a short circuit in the motor.

A further object of this invention is to provide an electric lawnmower wherein the traction wheels are not coupled to the motor, and the rotary blades do not normally contact the stationary blade.

With the above and other objects in view, my invention consists in the arrangement, combination and details of construction disclosed in the drawings and specification, and then more particularly pointed out in the appended claims.

In the drawings, wherein similar reference characters designate similar parts throughout the respective views;

Figure 2 is a horizontal section taken substantially on the line 2—2 of Figure 1.

Figure 1:
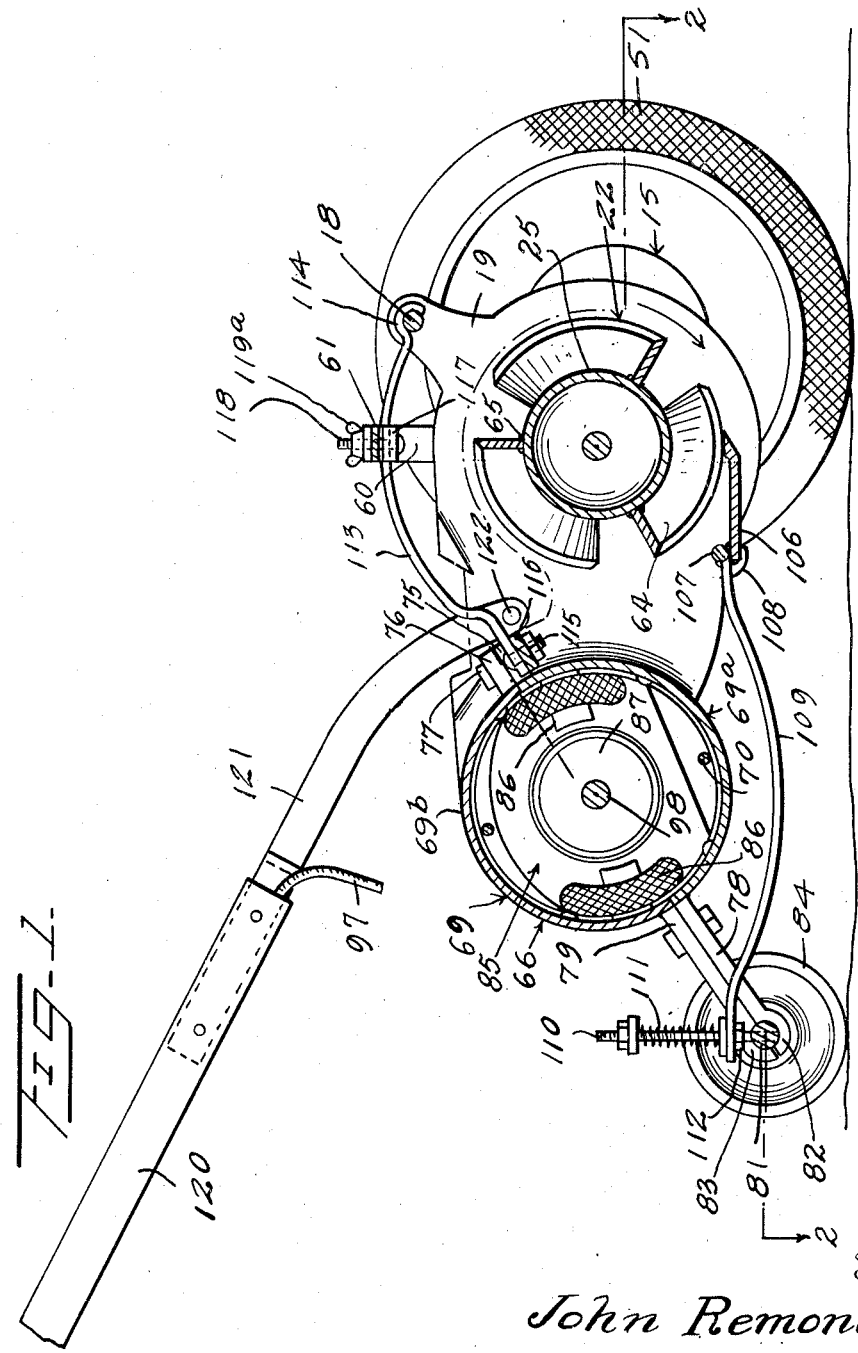
Figure 1 is a sectional view of an electric lawnmower constructed according to an embodiment of this invention taken on the line 1—1 of Figure 2.

Referring to the drawings, the numeral 15 designates generally a frame structure which is formed of a pair of side frame members 16, 17, connected together at their forward ends by means of a connecting bar 18. The bar 18 engages through upstanding ears 19 carried by the side members 16, 17 respectively. The side member 16 is formed adjacent the forward end thereof with inwardly projecting bearing boss 20 within which a stub shaft 21, carried by a reel or rotary cutter generally designated as 22 is adapted to rotatably engage. The side member 17 on the inner side thereof is also formed with an inwardly projecting boss 23, forming a bearing for a shaft 24 carried by reel 22.

A large gear 42 is fixed to the outer end of the shaft 37. The side member 17 has projecting outwardly therefrom a flange 43, forming a gear housing for speed reducing gears and a closure plate 44 is secured to the flange 43. The closure plate 44 is formed with inwardly projecting flange or rib 46 for holding the plate 44 in the proper position with respect to the flange or flanges 43. The plate 44 has formed integral therewith outwardly extending cap or hollow boss 47 which is in alignment with the cap or boss 33. The cap 35 has loosely mounted thereon a ring 48 which is formed with a forwardly projecting lug or ear 49. A stub shaft 50 is fixed in the ear or lug 49 and projects outwardly and forms a support for a traction wheel 51.

The cap 47 has loosely mounted thereon a ring 52 and a forwardly projecting lug or ear 53 is formed integral with ring 52 and has a stub shaft 54 fixed therein. A traction wheel 55 is journaled on the stub shaft 54. The ring 48 is held against endwise movement on the cap 35 by means of a plate 56 secured to the outer end of cap 35 by fastening means 57. The ring 52 is held on the cap 47 by means of a plate 58 secured to the outer end of cap 47 by means of a fastening member 59. The two rings 48, 52 are of like construction for eccentrically supporting the traction wheels 51, 55.

Rings 48 and 52 have projecting upwardly therefrom a lug 60 and a transversely extending connecting bar 61 connects the two rings 48, 52 together. The reel or rotary cutter 22 includes tubular member 25, and a plurality of spirally disposed cutting blades 64 which are secured to the outer surface of tubular member 25 by means of welding 65 or other suitable fastening means.

As shown in Figure 2, the blades 64 project beyond the ends of the tubular member or hub 25 and loosely engage over the bosses 20, 23. In this manner the outer ends of the blades 64 will provide a self-cleaning means for cleaning the bosses 20, 23 of any grass which might have a tendency to be wound about the bosses 20, 23.

The frame 15 has extending transversely between the side members 16, 17, a motor housing generally designated as 66. The housing 66 includes a cylindrical boss 67 which is formed integral with side member 16 and also includes a second cylindrical boss 68 which is formed integral with and projecting inwardly of the side member 17. A cylindrical member 69 is disposed between the two hollow bosses 67, 68, being firmly secured therebetween by means of clamping bolts 70 which extend through the inner housing member 69 and outer housing members 67, 68. The intermediate or inner housing member 69 is preferably formed with rabbeted opposite end portions 71, 72 which engage in complementary rabbets 73, 74 formed in the inner ends of the hollow members 67, 68 respectively. As shown in Figure 2, the inner or intermediate housing member 69 is formed of complementary semi-cylindrical sections 69a, 69b, so that when it is desired to remove the motor to be hereinafter described, the intermediate housing 69 may be opened up by drawing the end members or bosses 67, 68.

The complementary housing members 69a and 69b are formed with complementary ears 75, 76 respectively which are secured together by fastening members 77. There are two pairs of these ears 76, 75, which are disposed on the upper forward side of housing 69. Additional pairs of complementary ears 78, 79 are carried by the housing members 69a, 69b adjacent the lower rear sides thereof, and the ears 78, 79 are secured together by fastening members 80. A rear shaft 81 is fixedly carried by the ears 78, 79, the latter being formed with complementary clamping members 82, 83 for tightly receiving and clamping the shaft 81. The shaft 81 has journaled thereon a pair of metal wheels or rollers 84 which serve as a grounding means for electric current in the event there is a short circuit in the motor, which would have a tendency to shock the person operating this mower.

The electric motor generally designated as 85 is disposed within the intermediate housing 69 and includes a field winding 86 within which an armature 87 is rotatably mounted. The armature 87 is journaled in complementary bearings 88, 89 carried by bearing plates 90, 91 respectively. These bearing plates 90, 91 are disc-shape and engage in grooves 92, 93 formed on the inside of the housing 69. The motor 85 is a high speed motor and also includes a commutator 94 having a pair of brushes 96 engaging therewith and a pair of conductors generally designated as 97 are connected to the brushes 96 and are adapted to be extended to a suitable source of current supply.

The armature 87 includes an armature shaft 98 having mounted thereon a fan 99. The side member 16 is formed with a pair of arcuate openings 100 so that air may be drawn into the inside of the motor housing by rotation of the fan 99, and this air passes through arcuate openings 101 formed in the bearing plate 90 so that the incoming air can freely circulate about the motor as the motor operates. The housing 69 is also formed with a discharge opening 102 in the upper side thereof so that the air passing through the motor may pass out of the housing 69.

The armature shaft 98 extends into the gear housing formed by flange 43 and has fixed thereto a small gear 103. The gear 103 meshes with intermediate gear 104 journaled in bearings 105, and the gear 104 meshes with cutter gear 42. As will be noted, the motor 85 drives only the reel or rotary cutter 22 and is not operatively coupled to the traction wheels. In this manner the rotary cutter 22 can be operated at a relatively high speed so as to provide the necessary shearing action for the grass.

A stationary cutting blade 106 is disposed below the rotary cutter 22, being fixed to a bar 107. The bar 107 is rockably mounted at the opposite ends thereof in ears 108 carried by the opposite frame members and the lower or stationary cutter 106 is held in adjusted position with respect to the rotary cutter 22 by means of a rearwardly extending and longitudinally bowed bar 109. The forward end of bar 109 is welded or otherwise fixed to blade 106 and the bar 107 and projects rearwardly beneath the motor housing and overlies at its rear end the rear shaft 81.

A vertically disposed adjusting bolt or screw 110 is threaded at its lower end to the stationary shaft extending through the bar 109 and a spring 111 disposed about the bolt 110 constantly urges the rear end of the bar 109 downward so as to thereby yieldably rock the forward or cutting edge of blade 106 toward the rotary cutter 22. An adjusting nut 112 is threaded on bolt 110 below bar 109 and provides a means whereby the downward movement of bar 109 under the tension of spring 111 can be selectively adjusted in order that the cutting edge of the blades 106 may thereby be adjusted relative to the reel or rotary cutter 22.

In practice, the stationary cutter 106 will be slightly spaced from the rotary cutter or reel so that the blades of the rotary cutter will not contact the stationary blade. By forming the bar 109 in a downward bend, in the event an obstruction is encountered between the traction wheels, the obstruction will raise the bar 109 and thereby move the blade 106 away from the rotary cutter 22.

In order to provide a means whereby the rotary and stationary cutters may be vertically adjusted relative to the surface of the ground for regulating the type of the cutting action, the connecting bar 61 engages over a pair of longitudinally curved bars 113. The bars 113 are each provided at their forward ends with a split loop 114 engaging over the connecting bar 18 and the bars 113 extend downwardly and rearwardly and are fixed by fastening members 115 to a horizontally disposed supporting bar 116. The supporting bar 116 engages beneath the ears 75 and is secured thereto by fastening members 77.

The bar 61 is locked in adjusted position along the length of parallel bars 113 by means of a clamping bolt 118 which extends through the center of clamping bar 116 and a thumb nut 119a is threaded on the bolt 118. Loosening of the nut 119a will permit connecting bar 61 to be moved along the length of parallel guide bars 113 so as to thereby swing the lugs or ears 49, 53 and 60 either upwardly or downwardly and thereby raise or lower the frame structure.

An elongated hollow handle 120 which has extending from the forward end thereof a pair of outwardly bent bars 121 is rockably mounted on frame 15 by means of inwardly projecting pins 122 carried by the side frame members 16, 17. The conductor 97 is extended upwardly from the motor housing and is then passed through the hollow handle 120. A switch or the like may be disposed at any desired point along the hollow handle, being connected with the conductor 97 so that the motor may be operated or cut off as may be desired.

In the use and operation of this mower, the conductor 97 is connected to a source of electric current supply and is of sufficient length to provide for movement of the mower over the area to be mowed. When the motor 85 is energized, the rotary cutter 22 will be rapidly rotated through the gear train embodying gears 103, 104 and 42. The mower may be pushed over the ground with the rotary cutter rotating and the grass will be cut as it is whipped against the stationary cutter 106. In the event a stick or relatively heavy object should be engaged between the rotary cutter and the stationary cutter, the latter will be permitted to rock downwardly under the tension spring 111 so as to permit the object to pass between the two cutters. In this manner the two cutters will not be jammed by a large object as would be the case were the stationary cutter tightly mounted instead of floatingly mounted as hereinbefore described.

Through the use of a relatively high speed motor, this motor may be constructed of relatively small size so that the entire weight of the mower will be very substantially reduced over a construction which embodies the mounting of a slower speed motor on the mower frame. Furthermore, by embodying the motor housing as a part of the mower frame, the mower is made in very compact form and can thereby be made at a relatively low cost. In addition the complete enclosing of the motor in the connecting housing between the side members will eliminate any damage to the motor from any objects encountered in the movement of the mower over the surface of the ground.

I do not mean to confine myself to the exact details of construction herein disclosed but claim all variations falling within a purview of the appended claims.

What I desire to claim is:

1. In an electric lawnmower, a pair of parallel extending side frame members, an inwardly extending cylindrical flange formed on the rear portion of each of said frame members, a pair of complementary semi-cylindrical motor housing members formed with rabbeted opposite ends adapted to engage within the inner ends of said cylindrical flanges, a pair of spaced apart circumferential grooves formed in the inner surface of each of said semi-cylindrical members, a pair of annular bearing plates adapted to engage in said grooves, a shaft journalled in said bearing plates, an armature on said shaft, a field winding in said housing members, pairs of rearwardly extending complementary clamping members formed on the rear confronting edges of said housing members, a shaft adapted to be clamped between said clamping members, an electrically conducting ground engaging roller rotatably mounted on each end of said clamped shaft, and means extending through said side frame members for maintaining engagement between said motor housing members and said side frame members whereby said rollers provide means for grounding said side frame members and motor housing.

2. In an electric lawnmower, a pair of parallel extending side frame members, a cylindrical flange extending inwardly from the rear portion of each of said frame members, a motor housing including a pair of complementary semi-cylindrical members adapted to be disposed in edge confronting relation to each other and formed with rabbeted opposite ends for engagement within the inner ends of said cylindrical flanges, a pair of spaced apart circumferential grooves in the inner surfaces of said semi-cylindrical members, an annular bearing plate adapted to engage in each of said grooves, a shaft journalled in said bearing plates, an electric motor in said motor housing including a field winding carried by said semi-cylindrical members and an armature fixed on said shaft between said plates, a cooling fan fixed on said shaft between said armature and one of said bearing plates, a plurality of cooling openings formed in the other of said bearing plates and in the side frame member adjacent thereto, a plurality of air exhaust openings formed in said motor housing adjacent to said fan, complementary pairs of shaft clamping lugs extending rearwardly from said pair of semi-cylindrical members, a shaft adapted to be clamped between said pairs of lugs, and electrically conducting ground engaging roller means rotatably carried by said latter shaft whereby said fan and said inlet and exhaust openings provide for cooling of said electric motor, and said roller means ground said side frame members and motor housing.

JOHN REMONTE.

REFERENCES CITED

The following references are of record in the file of this patent:

UNITED STATES PATENTS

| Number | Name | Date |
| --- | --- | --- |
| 515,414 | Waters | Feb. 27, 1894 |
| 1,062,617 | Stryker | May 27, 1913 |
| 1,802,304 | Anderson | Apr. 21, 1931 |
| 1,836,386 | Nichols et al. | Dec. 15, 1931 |
| 2,260,801 | Clemson | Oct. 28, 1941 |
| 2,300,461 | Odell et al. | Nov. 3, 1942 |
| 2,340,849 | Wildeboor et al. | Feb. 8, 1944 |
| 2,398,300 | Frazier | Apr. 9, 1946 |

FOREIGN PATENTS

| Number | Country | Date |
| --- | --- | --- |
| 11,090 | Great Britain | of 1898 |